(No Model.)
A. & H. LAWSON.
OYSTER DREDGE WINDLASS.
No. 323,047. Patented July 28, 1885.
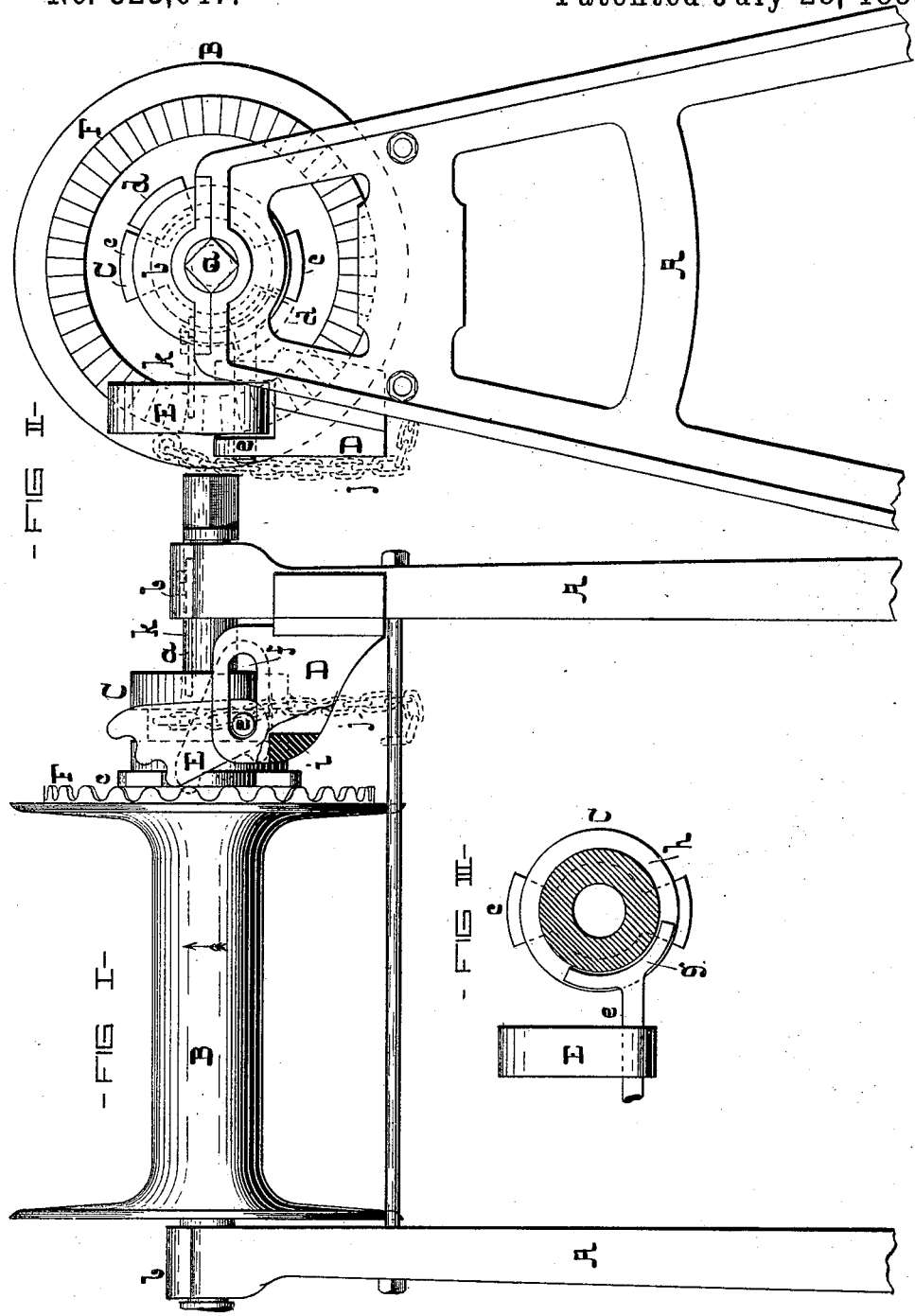

UNITED STATES PATENT OFFICE.

ALBERT LAWSON AND HENRY LAWSON, OF BALTIMORE, MARYLAND.

OYSTER-DREDGE WINDLASS.

SPECIFICATION forming part of Letters Patent No. 323,047, dated July 28, 1885.

Application filed December 22, 1884. (No model.)

*To all whom it may concern:*

Be it known that we, ALBERT LAWSON and HENRY LAWSON, both of the city of Baltimore, and State of Maryland, have invented certain Improvements in Oyster-Dredge Windlasses, of which the following is a specification.

The object of this invention, in common with others of its class, is to prevent accident from the rotation of the cranks or handles of the windlass in a reverse direction when the dredge attached to the moving rope is caught by a rock or other obstruction during the dredging operation.

The said invention consists in certain details of construction of the apparatus, as will hereinafter fully appear.

In the accompanying drawings, forming a part hereof, Figure I is a side elevation of the improved windlass, with a portion of the stand removed, and other parts shown partially in section. Fig. II is an end view of Fig. I. Fig. III is a detail of the windlass.

A is the stand of the windlass, and B the barrel on which the dredge-rope (not shown) is wound. The barrel rests loosely on the shaft $a$, which is confined in suitable bearings, $b$, forming parts of the stand.

C is a clutch on the shaft $a$, adapted to slide longitudinally on it. A feather (not shown) on the shaft $a$ prevents independent rotation of the clutch and shaft; consequently, when the shaft is rotated by means of the cranks (not shown) the clutch revolves with it. Projections $c$ on the face of the clutch engage, when thrown in gear, with others, $d$, on the end of the barrel, (see Fig. II,) and cause the latter to revolve with it.

D is a bracket, bolted to or cast with the stand A.

E is a toothed pawl, having a pin, $e$, which rests in slots $f$ in the jaws of the bracket D. When the clutch is in gear, the lower tooth of the pawl only, is in contact with the toothed disk F on the face of the barrel B, and as the barrel is revolved in the direction indicated by the arrow, (Fig. I,) the pawl trips or falls from one tooth of the disk to another, and does not affect the winding of the dredge-rope. Should, however, the dredge be stopped by contact with any obstruction, and the direction of revolution of the barrel and the handles be reversed, the toothed pawl E is drawn in, and as the pin $e$ has a fork, $g$, at its inner end, (see Fig. III,) which rests in the groove $h$ of the clutch, the said clutch is carried out and disengaged from the barrel. A stop, $i$, prevents the pawl from falling below a horizontal line.

It will be understood that when the clutch is out of gear with the barrel the persons which have hold of the handles cannot be injured, as they often are when using windlasses unprovided with detaching mechanism.

Either a chain (shown in dotted lines, Figs. I and II, and denoted by $j$) or a movable arm, $k$, (also shown in dotted lines, same figures,) may be used to prevent the pawl E from being thrown back beyond a vertical position, where it would remain.

We claim as our invention—

In combination with the barrel B, having the toothed disk F, adapted to revolve loosely on the shaft $a$, the clutch C, which rests on a feather on the said shaft, toothed pawl E, pin $e$, with the fork $g$, and the slotted bracket D, substantially as specified.

ALBERT LAWSON.
HENRY LAWSON.

Witnesses:
E. F. FLAHERTY,
CHAS. W. ARNOLD.